United States Patent
Cielocha (10) Patent No.: US 10,332,211 B1
(45) Date of Patent: Jun. 25, 2019

(54) RISK ANALYSIS BASED ON ELECTRONIC SECURITY LEVELS OF A VEHICLE

(71) Applicant: STATE FARM MUTUAL AUTOMOBILE INSURANCE COMPANY, Bloomington, IL (US)

(72) Inventor: Steven Cielocha, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 563 days.

(21) Appl. No.: 15/060,164

(22) Filed: Mar. 3, 2016

(51) Int. Cl.
*G06Q 40/08* (2012.01)
*G06F 21/31* (2013.01)
*G06F 21/57* (2013.01)

(52) U.S. Cl.
CPC .............. *G06Q 40/08* (2013.01); *G06F 21/31* (2013.01); *G06F 21/577* (2013.01); *G06F 2221/034* (2013.01)

(58) Field of Classification Search
CPC ...................................................... G06Q 40/08
USPC ............................................................ 705/4
See application file for complete search history.

(56) References Cited

U.S. PATENT DOCUMENTS

2002/0111725 A1* 8/2002 Burge ................... G06Q 40/08
701/31.4
2011/0270635 A1* 11/2011 Raines .................. G06Q 10/10
705/4

OTHER PUBLICATIONS

Automobile Security Concerns; IEEE Vehicular Technology Magazine, (vol. 4, Issue 2); Jun. 1, 2009. (p. 4 of NPL attached).*

* cited by examiner

Primary Examiner — Edward Chang
(74) Attorney, Agent, or Firm — Marshall, Gerstein & Borun LLP; Randall G. Rueth (57) ABSTRACT

A computer-implemented method for determining a risk rating of a vehicle. The method includes receiving information indicative of protections against unauthorized electronic access to one or more electronic systems of a vehicle. The method includes determining a vehicle security level based at least on the information indicative of protections against unauthorized electronic access. The method includes determining a risk rating associated with the vehicle. The method includes setting at least one parameter of an insurance policy associated with the vehicle based on at least the determined risk rating.

17 Claims, 5 Drawing Sheets

RISK ANALYSIS BASED ON ELECTRONIC SECURITY LEVELS OF A VEHICLE

TECHNICAL FIELD

The present application relates generally to electronic vehicle systems and, more specifically, to systems and methods for analyzing security levels of electronic vehicle systems to determine risk.

BACKGROUND

Over time, more and more of the various subsystems within a vehicle (e.g., ignition system, automatic transmission, anti-lock braking system, etc.) have become subject to electronic control. While each manufacturer builds some level of security into its vehicle electronic systems, some manufacturers contain security threats better than others. Moreover, when software updates become available to improve security measures, there is no guarantee that these updates will be installed. These and other factors create an environment with differing levels of security controls across, and within, manufacturers. Vehicles without the latest software updates, or otherwise having low levels of electronic security, are at a higher risk of unauthorized remote access to the various subsystems within the vehicle. Unauthorized remote access to a vehicle can cause various problems, such as compromising the safety of the driver, passengers, and/or other drivers, making the vehicle more prone to theft, and so on. Today, insurers have no means to account for risks such as these during the underwriting process.

SUMMARY

In accordance with a first example aspect, a computer-implemented method includes receiving, at a computing system including one or more processors, information indicative of protections against unauthorized electronic access to one or more electronic systems of a vehicle. The method also includes determining, by the one or more processors, a vehicle security level based at least on the information indicative of protections against unauthorized electronic access. The method also includes determining, by the one or more processors and based at least on the vehicle security level, a risk rating associated with the vehicle. The method also includes setting, by the one or more processors, at least one parameter of an insurance policy associated with the vehicle based on at least the determined risk rating.

In accordance with a second example aspect, a system includes one or more computing devices and a non-transitory computer-readable memory coupled to the one or more computing devices. The non-transitory computer-readable memory stores thereon instructions that, when executed by the one or more computing devices, cause the system to receive information indicative of protections against unauthorized electronic access to the one or more electronic systems of a vehicle. The instructions also cause the system to determine a vehicle security level based at least on the information indicative of protections against unauthorized electronic access. The instructions also cause the system to determine, based at least on the vehicle security level, a risk rating associated with the vehicle. The instructions also cause the system to set at least one parameter of an insurance policy associated with the vehicle based on at least the determined risk rating.

In accordance with a third example aspect, a computer-implemented method includes receiving, at a computing system including one or more processors, information indicative of updated protections against unauthorized electronic access installed on one or more electronic systems of a vehicle. The method also includes determining, by the one or more processors, a vehicle security level based on the information indicative of the updated protections against unauthorized electronic access. The method also includes determining, by the one or more processors and based on the vehicle security level, a risk rating associated with the vehicle. The method also includes modifying, by the one or more processors, at least one parameter of an insurance policy associated with the vehicle based on the determined risk rating.

In further accordance with any one or more of the foregoing first, second, or third example aspects, a computer-implemented method, a system, or a computer-implemented method may further include any one or more of the following preferred forms.

In one form, determining whether the vehicle security level is increased in accordance with one or more security updates available for the one or more electronic systems, determining a modification to the at least one parameter based at least on whether the vehicle security level is increased in accordance with the one or more security updates, and modifying the at least one parameter in accordance with the determined modification.

In another form, causing a policy holder of the insurance policy to be notified about the modification.

In another form, determining the vehicle security level includes determining a security metric of each of the one or more electronic systems of the vehicle, wherein the security metric is indicative of potential loss associated with the vehicle, and determining the vehicle security level based at least on the information indicative of protections against unauthorized electronic access and the determined security metric.

In another form, receiving the information indicative of protections against unauthorized electronic includes receiving one or more of (i) a type of software of each of the one or more electronic systems of the vehicle, (ii) an update of each of the one or more electronic systems of the vehicle, and (iii) a version of software of each of the one or more electronic systems of the vehicle.

In another form, receiving the information indicative of protections against unauthorized electronic access includes causing a wireless communication link to be established with the vehicle.

In another form, receiving the information indicative of protections against unauthorized electronic access via the wireless communication link, receiving vehicle identification information stored in one or more electronic systems of the vehicle via the wireless communication link, and identifying the insurance policy associated with vehicle based on the received vehicle identification information.

In another form, receiving the information indicative of protections against unauthorized electronic access includes causing a communication link to be established with a mobile device, wherein the mobile device is configured to communicate with the vehicle.

In another form, a database, wherein the database stores one or both of (i) one or more currently available security updates corresponding to at least one of the one or more electronic systems of the vehicle and (ii) one or more currently available versions of software corresponding to at least one of the one or more electronic systems of the vehicle.

In another form, determining the vehicle security level based at least on the information indicative of protections against unauthorized electronic access includes retrieving from the database one or both of (i) the one or more currently available security updates and (ii) the one or more currently available versions of software, and determining the vehicle security level based at least on the information indicative of protections against unauthorized electronic access and one or both of (i) the one or more currently available security updates and (ii) the one or more currently available versions of software.

DETAILED DESCRIPTION

In order to determine a risk rating for, and/or modifications to, a vehicle insurance policy, a system may be configured to receive security information such as information about protections against unauthorized electronic access (e.g., software types and/or versions). In some embodiments the information may be provided to an insurance agent over the phone. In other embodiments, the information may be provided to the system via an online interface. In still other embodiments, the information may be automatically obtained (e.g., along with vehicle telematics data representing speed, brake usage, etc.).

The received information may be analyzed in order to determine a vehicle security level. For example, the information may be analyzed to determine whether the vehicle has the latest updates installed for one or more electronic systems. As another example, the information may be analyzed to determine whether the version(s) of the software installed for the electronic system(s) is/are the most current version(s). As used herein, the term "software" is used to broadly refer to software, firmware, or any combination of the two, except where a narrower meaning (e.g., non-firmware) is clearly indicated by the context of the usage.

In one example, if it is determined that the protections against unauthorized electronic access match (e.g., have the same version number as) the currently available updates, then a vehicle security level of "Good" may be assigned. In another example, if the protections against unauthorized electronic access are based on one or more previous versions of software and do not match the currently available updates, then a vehicle security level of "Poor" may be assigned. Other indicators or scoring schemes may also be used to reflect the security level (e.g., a grade between "A" and "F," or a score between 0 and 100, etc.).

A risk rating may be based on the determined vehicle security level, with a higher level of vehicle security (e.g., a vehicle security level of "Good") resulting in a lower risk rating that reflects a low likelihood of unauthorized access to the vehicle electronics, and with a lower vehicle security level (e.g., a vehicle security level of "Poor") resulting in a high risk rating that reflects a high likelihood of unauthorized access to the vehicle electronics. While "low" and "high" risk ratings are used herein to refer to low and high levels of risk, respectively, it is understood that some rating schemes may use higher scores to represent lower-risk scenarios and lower scores to represent higher-risk scenarios. The risk rating may also account for additional parameters, such as gender, age, traffic violation history, vehicle specifications, etc.

A parameter of the vehicle insurance policy may be set or modified based on the determined risk rating. For example, if the determined risk rating is low, then a parameter such as a monthly premium of the vehicle insurance policy may be lowered. In this example, the lowered monthly premium may serve as an incentive for an individual to install the most recent updates to his or her vehicle electronics software.

Figure 1:
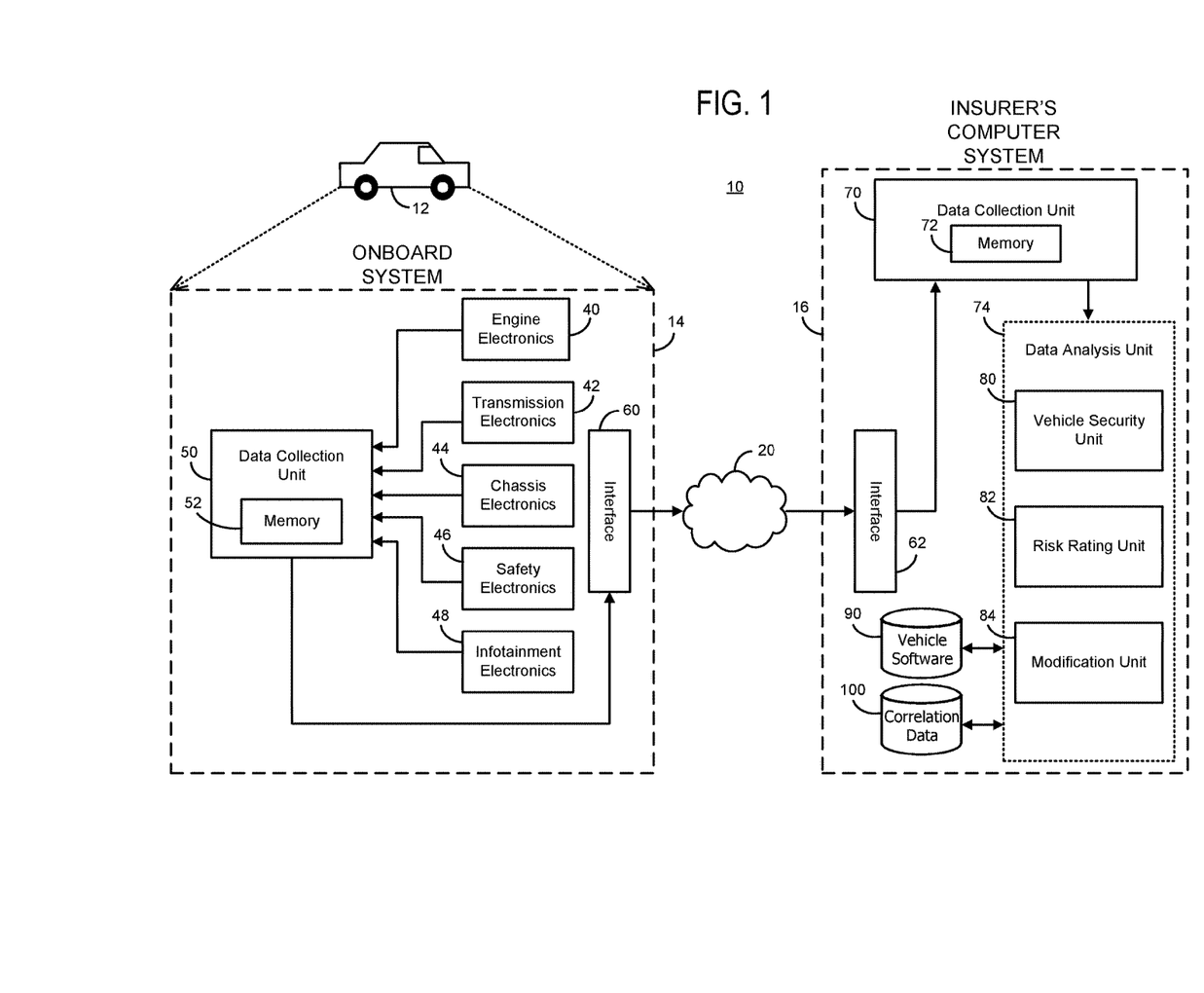
FIG. 1 is a block diagram of an example system in which the techniques described herein may be implemented.

FIG. 1 is a block diagram of an example system 10 in which the techniques described herein may be implemented. The system 10 includes a vehicle 12 with an on-board system 14, an insurer's computer system 16, and a network 20. While FIG. 1 depicts vehicle 12 as an automobile, vehicle 12 may instead be a truck, motorcycle, or any other type of land-based vehicle capable of carrying at least one human passenger (including the driver). The onboard system 14 comprises various different subsystems arranged within and/or on the exterior of vehicle 12. The onboard system 14 is in communication with the insurer's computer system 16 via network 20. The network 20 may be a single network, or may include multiple wired and/or wireless networks of one or more types (e.g., a cellular telephone network, a wireless local area network (WLAN), the Internet, etc.). FIG. 1 represents a particular embodiment in which the security information is automatically sent to the insurer's computer system 16 from the vehicle 12. In other embodiments, however, the security information may be provided to an insurance agent over the phone, or a customer may enter the security information on a website by using a client computing device (e.g., a smartphone, laptop, etc.) and a web browser, etc. Moreover, while FIG. 1 shows only a single vehicle 12, it is understood that there may be multiple (e.g., thousands) of vehicles with similar onboard systems in communication with the insurer's computer system 16 via network 20 and/or other networks.

The onboard system 14 also includes subsystems that monitor and/or control various operational parameters of vehicle 12. In the example system 10 of FIG. 1, an engine electronics subsystem 40 controls and/or monitors the engine of vehicle 12 (e.g., controls air-fuel ratio, throttle, fuel injection rate and/or measures temperature, pressure, flow at different points within the engine, etc.), a transmission electronics subsystem 42 controls and/or monitors the shifting of the gears of vehicle 12 (e.g., for shifting gears smoothly during acceleration of the vehicle, etc.), a chassis electronics subsystem 44 controls and/or monitors various subsystems of the vehicle 12 (e.g., anti-lock braking system, traction control system, etc.), a safety electronics subsystem 46 controls and/or monitors active and passive safety features of vehicle 12 (e.g., collision warning, adaptive cruise control, etc.), and an infotainment electronics systems 48 controls operation of entertainment and information subsystems of vehicle 12 (e.g., vehicle navigation system, vehicle audio system, etc.).

In some embodiments, the onboard system 14 does not include one or more of the subsystems 40, 42, 44, 46 and 48, and/or the onboard system 14 includes additional devices or subsystems not shown in FIG. 1. Moreover, one or more other subsystems in onboard system 14 may be included in a general purpose computing device not integrated into vehicle 12, such as a smartphone. For example, a GPS subsystem may include a software application running on a smartphone that includes the appropriate hardware (e.g., an antenna and receiver).

The onboard system 14 also includes a data collection unit 50 configured to receive data and/or analog signals from subsystems 40, 42, 44, 46 and/or 48. The data collection unit 50 may collect the data and/or analog signals substantially in real time, and in any of various different ways, according to different embodiments. In some embodiments, for example, the data collection unit 50 periodically samples data and/or analog signals from the various subsystems 40, 42, 44, 46 and/or 48, or is notified by the respective sensors or subsystems when new data is available, etc. In some embodiments, the data collection unit 50 receives data from subsystems 40, 42, 44, 46 and/or 48 via a wireless link, such as a Bluetooth link. In some embodiments, the data collection unit 50 also ensures that data from subsystems 40, 42, 44, 46 and/or 48 can be synchronized, e.g., by generating a time stamp for each sampled data point, or by storing in memory 52 time stamps that are received from subsystems 40, 42, 44, 46 and/or 48 along with the corresponding data points.

In one embodiment, data collection unit 50 stores a certain amount of data collected from subsystems 40, 42, 44, 46 and/or 48 by storing the data in memory 52, and sends all or a portion of the stored data to interface 60 according to one or more predetermined events (e.g., receiving a request to transmit data). For example, data collection unit 50 may detect an update to software associated with one or more subsystems 40, 42, 44, 46 and 48 and store information about the update(s) (e.g., version(s) of the software update(s), date(s) and time(s) installed, corresponding subsystem(s), etc.). Once the stored data is transmitted to the insurer's computer system 16 via network 20, further processing of the data may be performed as discussed further below.

In one embodiment, the data collection unit 50 may also be configured to collect operational data (e.g., data indicative of speed, braking, cruise control, etc.) from the subsystems and/or other data (e.g., sensed environmental data). In one such embodiment, the data collection unit 50 may also collect information relating to the security level based on header information (e.g., software version associated with a subsystem) within one or more data packets or other data units corresponding to the operational data and/or other data. The operational data may reflect information generated by any of various devices or subsystems of vehicle 12 that monitor and/or control operational parameters of vehicle 12. The operational data may also be provided to the insurer's computer system 16 for further processing.

In some embodiments, the data collection unit 50 may convert data received from one or more of sensors not shown in FIG. 1, and/or one or more of subsystems 40, 42, 44, 46 and 48, to different digital formats or protocols. After collecting (and possibly converting) the data from the various sensors/subsystems, the data collection unit 50 stores the data in a memory 52. The memory 52 may be any suitable type or types of data storage, such as a random access memory (RAM), a flash memory, or a hard drive memory, for example.

The data collection unit 50 is coupled to an interface 60, which transmits the data received from data collection unit 50 to the insurer's computer system 16 via the network 20. The interface 60 may include a transmitter and one or more antennas, for example. In one embodiment, the interface 60 may be coupled to a general purpose computing device such as a smartphone. For example, the interface 60 may be coupled to a driver's or passenger's smartphone via a wireless link and through the use of the smartphone, transmit data to the insurer's computer system 16 via one or more cellular networks. In an alternative embodiment, the interface 60 is instead an interface to a portable memory device, such as a portable hard drive or flash memory device. In this embodiment, the portable memory device may be used to download data from memory 52 of data collection unit 50, and may be manually carried to the insurer's computer system 16 without utilizing network 20. Alternatively, the portable memory device, or a Bluetooth link, may be used to download data from memory 52 to a field agent's computer device (e.g., laptop or smartphone), which may in turn be used to transmit the data to the insurer's computer system 16 via network 20.

In some embodiments, the data generated by data collection unit 50 and stored in memory 52 (e.g., data reflecting protections against unauthorized electronic access, operational data, etc.) is automatically sent to interface 60 for transmission to the insurer's computer system 16. For example, the data may be sent to interface 60 at regular time intervals (e.g., once per day, once a month, once per insurance billing cycle, etc.). In other embodiments, the data is sent to the insurer's computer system 16 in response to a query from the insurer's computer system 16 that is received via network 20, or in any other suitable manner.

The insurer's computer system 16 is an electronic processing system with one or more computing devices (e.g., servers) capable of performing various functions described below, and includes an interface 62 configured to receive data from the onboard system 14 of vehicle 12 via network 20. Interface 62 may be similar to interface 60 of the onboard system 14, for example. In embodiments where a portable memory device (rather than network 20) is used to transfer data from the onboard system 14 to the insurer's computer system 16, interface 62 is an interface to a portable memory device, such as a portable hard drive or flash memory device, for example.

The insurer's computer system 16 also includes a data collection unit 70 coupled to interface 62. The data collection unit 70 is configured to receive/collect the data received by interface 62, and to store the collected data in a memory 72. The memory 72 may be any suitable type of data storage, such as a RAM, a flash memory, or a hard drive memory, for example. The data collection unit 70 is coupled to a data analysis unit 74. Data analysis unit 74 may include one or more processors, and is configured to process the data collected by data collection unit 70 and stored in memory 72 for various purposes according to different embodiments, as discussed further below.

In the example system 10 of FIG. 1, the data analysis unit 74 includes a vehicle security unit 80, a risk rating unit 82, and a modification unit 84. In other embodiments, data analysis unit 74 does not include one or more of units 80, 82, and 84 and/or includes additional processing units not shown in FIG. 1. In one embodiment, each of units 80, 82, and 84 includes a set of instructions stored on a tangible, non-transitory computer-readable medium and capable of being executed by the processor(s) of data analysis unit 74 to perform the functions described below. In another embodiment, each of units 80, 82, and 84 includes a set of one or more processors configured to execute instructions stored on a tangible, non-transitory computer-readable medium to perform the functions described below. In an embodiment, data analysis unit 74 includes a memory (not shown in FIG. 1) for storing outputs of the analysis performed by data analysis unit 74.

The insurer's computer system 16 also includes a vehicle software database 90. The vehicle software database 90 can be accessed by the vehicle security unit 80, and/or other units within data analysis unit 74. In one embodiment, the vehicle software database 90 may store currently available security updates corresponding to one or more electronic systems (e.g., engine electronics 40, transmission electronics 42, chassis electronics 44, safety electronics 46, infotainment electronics 48) of vehicle 12. In another embodiment, the vehicle software database 90 may store currently available versions of software corresponding to electronic systems of vehicle 12. The vehicle software database 90 may also be configured to receive notifications of, and possibly detailed information regarding, security updates based on one or more manufacturer's schedules.

The insurer's computer system 16 also includes a correlation database 100. The correlation database 100 can be accessed by the risk rating unit 82, and/or other units within data analysis unit 74. In one embodiment, the correlation database 100 may store data that is generated based on historical data associated with other vehicles and/or vehicle 12. In some embodiments, the correlation database 90 may include data modeling correlations between vehicle security levels and risk ratings. The correlation data/models may be manually entered information, or may be learned by the insurer's computer system 16 (or another computer system not shown in FIG. 1) based on vehicle data and claims data of a plurality of other vehicles.

In operation, the vehicle security unit 80 may receive various types of security information relating to vehicle 12 from memory 72 of data collection unit 70. The security information may be information indicative of protections against unauthorized electronic access to vehicle 12, such as (i) a type of software of each of one or more of the electronic subsystems 40, 42, 44, 46 and/or 48, (ii) an update of each of one or more of the electronic subsystems 40, 42, 44, 46 and/or 48, and (iii) a version of software of each of one or more of the electronic subsystems 40, 42, 44, 46 and/or 48.

In some embodiments, the vehicle security unit 80 determines a vehicle security level based on the data from the electronic subsystems 40, 42, 44, 46 and/or 48, and also based on data within vehicle software database 90. For example, the vehicle security unit 80 may retrieve from vehicle software database 90 information regarding the most recent security updates available for the electronic subsystems 40, 42, 44, 46 and/or 48, and/or the most recent versions of software available for the electronic subsystems 40, 42, 44, 46 and/or 48. The vehicle security unit 80 may then determine the vehicle security level for vehicle 12 by comparing the data from the electronic subsystems 40, 42, 44, 46 and/or 48 to the retrieved security information.

In one example scenario, the vehicle security unit 80 may determine the type of software installed on the chassis electronics 44 and retrieve from the vehicle software database 90 a pre-determined security level corresponding to the type of software installed on the chassis electronics 44. In this scenario, based on the type of software installed corresponding to a poor rating (e.g., that type of software is known to have issues), the vehicle security unit 80 may set the vehicle security level to "C" (or "Poor," or "50," etc.).

In another example scenario, the vehicle security unit 80 may compare the date of a latest update made to the transmission electronics 42 to a release date of a currently (e.g., most recently) available update to the transmission electronics 42. In this scenario, if the update was made on or after the release date, the vehicle security unit 80 may set the vehicle security level to "A" (or "Good," or "100," etc.) to indicate that the most recent software update has been installed.

In another example scenario, the vehicle security unit 80 may compare the version of the software currently installed in the safety electronics 46 to a currently (e.g., most recently) available version of software of the safety electronics 46 and determine whether the versions are the same. In this scenario, if the version numbers match, the vehicle security unit 80 may determine a vehicle security level of "A" (or "Good," or "100," etc.) to indicate that the safety electronics 46 has the most recent version of software installed.

The security level may be set on a subsystem by subsystem basis. In one example, the security level can be a single value determined based on security levels/scores determined for each of the multiple subsystems. In one example, three subsystems could have scores of 75, 100, and 50, and the total level would be 75 based on the average of the three scores. In one example, the sub-scores/levels could be weighted (e.g., based on criticality of the subsystem), as described further below.

In one embodiment, the security information may be used to update one or more electronic security fields associated with vehicle 12 in a policy database not shown in FIG. 1 (e.g., a database that stores ratings-relevant information like gender, age, etc.). In this example, vehicle security unit 80 may get the security information (e.g., version, or date of last update, etc.) from the policy database instead of data collection unit 70 or memory 72. In one example, the policy database may also store the determined security level in one of the fields for the policy associated with vehicle 12.

The risk rating unit 82 may receive the vehicle security level from the vehicle security unit 80. In one example, the risk rating unit 82 may retrieve the vehicle security level and other factors from the policy database. For instance, the risk rating unit 82 may retrieve a field value (e.g., "Good" or "72" etc.) associated with the vehicle security level in addition to other field values (e.g., "female" for gender, "45" for age, etc.) in order to determine the risk rating. The risk rating unit 82 may determine the risk rating by executing an algorithm based on the determined vehicle security level. The risk rating unit 82 may also use additional parameters (e.g., driving history of a policy holder, vehicle specifications, etc.) to determine the risk rating. The risk rating unit 82 may then provide the risk rating to the modification unit 84.

The modification unit 84 may receive the risk rating, and set at least one parameter of the insurance policy based on the determined risk rating. The at least one parameter of the insurance policy may relate to the cost of the insurance policy. For example, in order to provide an incentive to an individual to maintain the electronic systems of vehicle 12 updated, a premium of the insurance policy may be lowered if the software installed on the vehicle electronics is the most current version available, and/or has the most recent software update installed. The modification unit 84, or another unit not shown in FIG. 1, may also cause an electronic and/or paper communication to be generated and sent to the owner of the policy associated with vehicle 12, with the communication providing notice of the modification(s) made to the policy.

Figure 2:
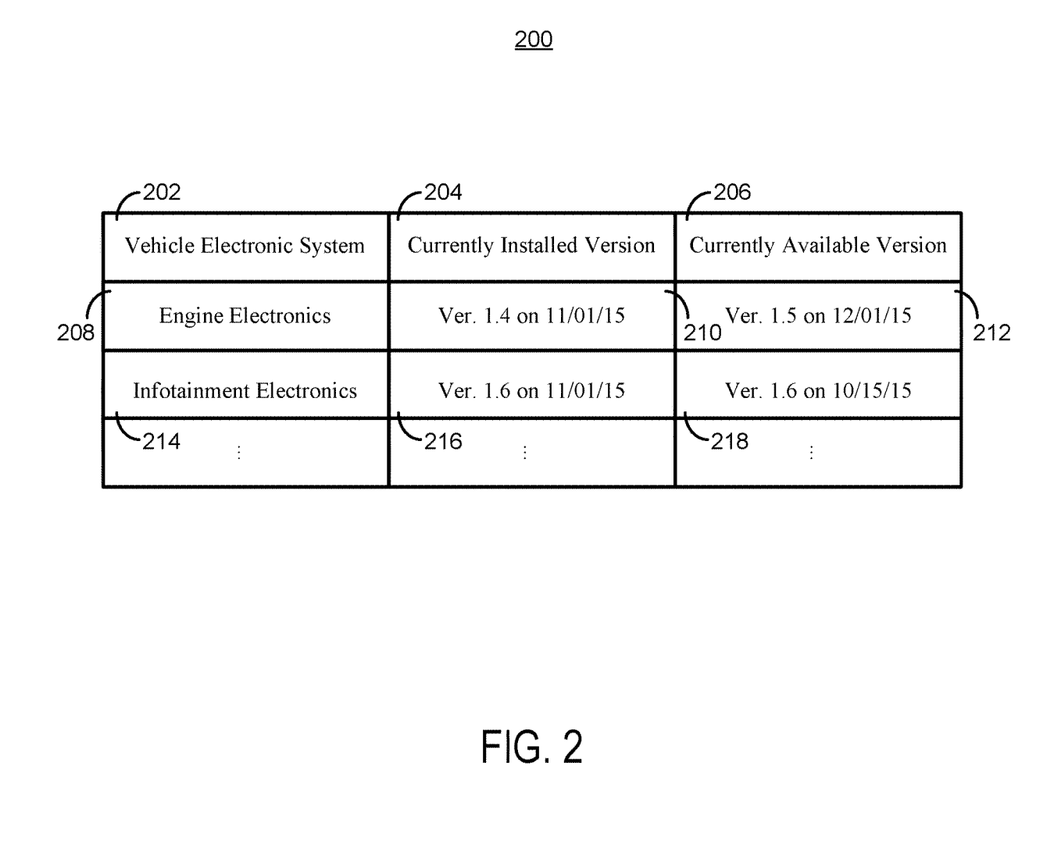
FIG. 2 is a diagram illustrating an example table including information that may be collected and/or stored in the system of FIG. 1.

FIG. 2 is a diagram illustrating an example table 200 including information that may be collected and/or stored in the system 10 of FIG. 1. In one example, the vehicle security unit 80 of FIG. 1 may gather and process the information within table 200. As shown in FIG. 2, the table 200 includes vehicle electronic system field 202, currently installed version field 204, and currently available version field 206. Table 200 also includes field values 208, 210, 212, 214, 216, and 218. Field values 208 and 214 are associated with the type of electronic system of a vehicle such as Engine Electronics and Infotainment Electronics, respectively. Field values 210 and 216 are associated with the currently installed version of software and date of installation corresponding to the Engine Electronics and the Infotainment Electronics, respectively. Field values 212 and 218 are associated with the currently (e.g., most recently) available versions of software and date of when the version was made available by the vehicle manufacturer or other supplier of software and/or software updates, for the Engine Electronics and the Infotainment Electronics, respectively.

In one embodiment, the field values 208, 210, 212, 214, 216, and 218 of table 200 may be received from various sources. For example, the field values 210 and 216 may be transmitted by a vehicle (e.g., onboard system 14 of vehicle 12), or by a mobile device (e.g., a mobile device communicatively coupled to the onboard system 14 of FIG. 1), to an insurance company (e.g., insurer's computer system 16 of FIG. 1). In another example, the field values 208, 212, 214 and 218 may be retrieved from a third-party (e.g., vehicle manufacturer or vehicle subsystem manufacturer) server or database and stored in the vehicle software database 90 of FIG. 1.

In one embodiment, table 200 may include additional fields that include a security metric for one or more vehicle electronic subsystems (e.g., one or more of electronic subsystems 40, 42, 44, 46 and/or 48 of FIG. 1). In one example, the security metric may be pre-determined based on the potential loss associated with the vehicle, with the potential loss in turn being based on how critical the particular vehicle subsystem is to safe operation of the vehicle. For instance, if a chassis electronics subsystem is controlled by software that enable and disables the anti-lock braking system of the vehicle, then a field value of "High" may be associated with a security metric field in order to reflect a higher risk associated with the chassis electronics subsystem.

The vehicle security level may be determined in various ways with regard to the security information of the vehicle electronic subsystems. For example, when a vehicle electronic subsystem has not been updated, the vehicle security unit 80 may use a rules-based approach that considers the number of vehicle electronic subsystems that are updated in order to arrive at a vehicle security level. In one instance, all of the vehicle electronic subsystems may need to be current in order for the vehicle security unit 80 to determine a vehicle security level of "Good." In one instance, a predetermined one or two vehicle electronic subsystems may be the deciding factors when determining the vehicle security level. A rules-based approach may include various rules that specify how to weigh one or more parameters or characteristics of the software (e.g., version, type of software, etc.) that correspond to the vehicle electronic subsystems when determining the vehicle security level.

In one embodiment, the vehicle security unit 80 of FIG. 1 may be configured to compare the field values 210 and 216 to the field values 212 and 218, respectively. Based on the comparison, the vehicle security unit 80 may determine that the software corresponding to the engine electronics has not been updated to the most current version, and that the software corresponding to the infotainment electronics is current. In this scenario, the vehicle security unit 80 may determine the vehicle security level to be "Fair" based on the fact that software for one of the two subsystems is up to date. Alternatively, the vehicle security unit 80 may retrieve, from table 200, security metrics reflecting the relative criticality of the engine electronics as compared to the infotainment electronics, and use those security metrics to weigh the engine electronics software more heavily. In such a scenario, the vehicle security level may be determined to be "Poor," for example.

In another embodiment, the vehicle security unit 80 may also, or instead, be configured to account for the install date associated with the currently installed software, and compare the install date to when the currently available software was made available. As shown in FIG. 2, the currently installed version of software corresponding to the engine electronics was installed (e.g., updated) on Nov. 1, 2015 while the current available version of software corresponding to the engine electronics was made available on Dec. 1, 2015. In this example, the vehicle security unit 80 may determine the vehicle security level to be "Standard" (or "Good," etc.) based on the current available version having been made available only one month after the latest update of the engine electronics. In another example, the vehicle security unit 80 may determine the vehicle security level to be "Poor" based on the currently installed software not matching the current available version. In one scenario, the insurer's computer system 16 may be configured to notify an individual of the current available software (e.g., by paper statement, email, text message, etc.) before proceeding to check again if the software has been updated at a later point in time.

The vehicle security unit 80 may also, or instead, be configured to determine the vehicle security level according to one or more criteria associated with the software corresponding to the electronic systems. For example, in one embodiment, the vehicle security unit 80 may determine the vehicle security level depending on the number of the electronic systems of the vehicle that have not been updated. For instance, if only one electronic system remains to be updated, as shown in FIG. 2, then the vehicle security unit 80 may determine that the vehicle security level is "Standard."

Table 200 may also include additional and/or other fields used to determine a vehicle security level. For example, a field associated with a date of last update only (e.g., without the version number) may be included in table 200. In another example, table 200 could include an additional field that indicates how critical to safety one or more vehicle subsystems is to the operation of the vehicle (e.g., as mentioned above with respect to the chassis electronics).

Figure 3:
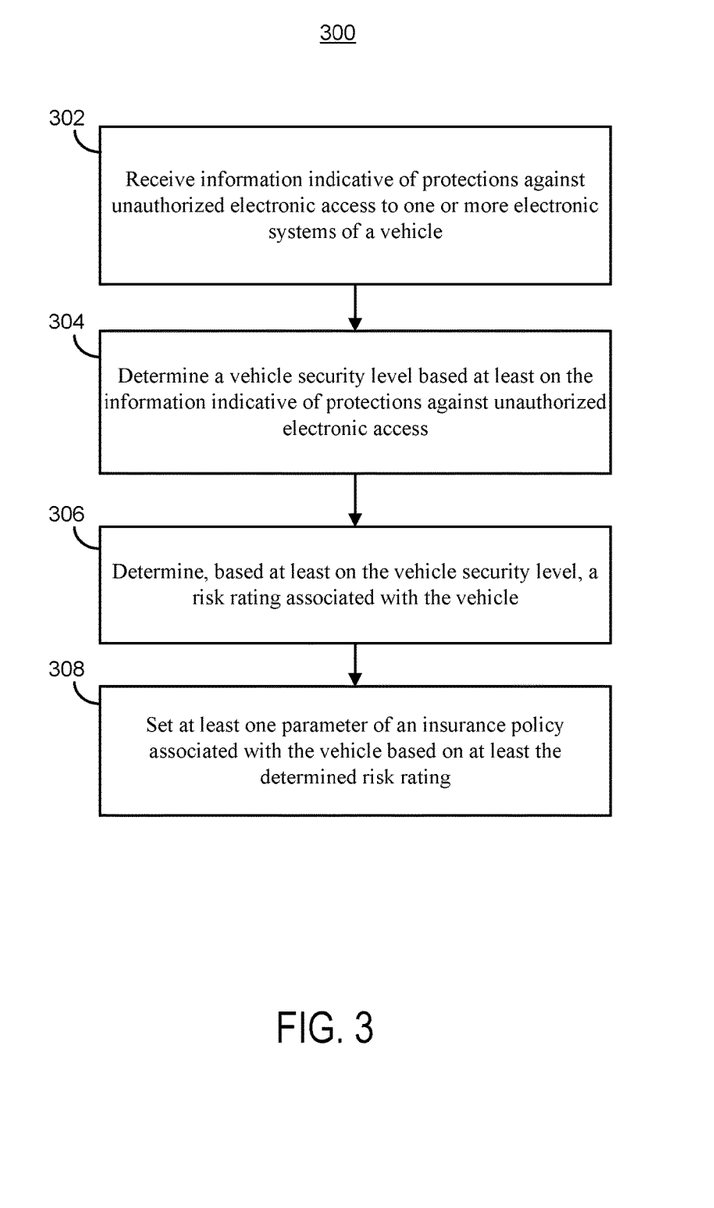
FIG. 3 is a flow diagram of an example method of determining a parameter of an insurance policy according to an embodiment of the present disclosure.
Figure 4:
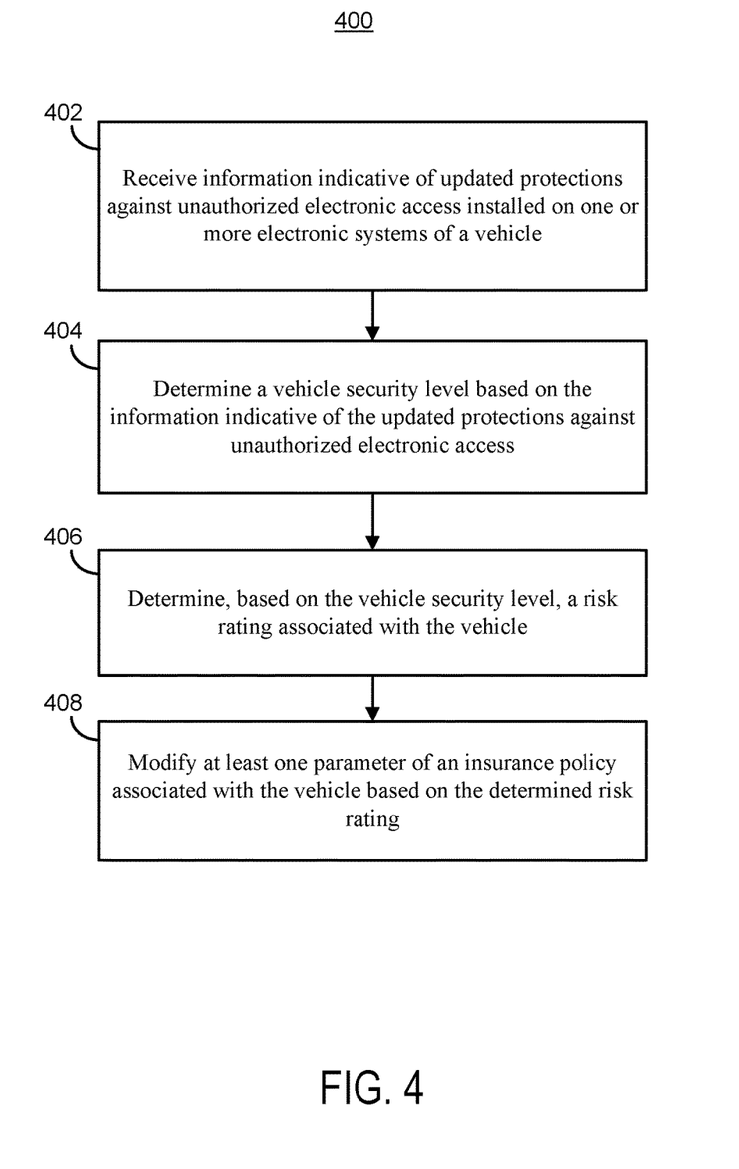
FIG. 4 is a flow diagram of another example method of determining a parameter of an insurance policy according to an embodiment of the present disclosure.

FIGS. 3 and 4 are flow diagrams of example methods for determining a parameter of an insurance policy each in accordance with at least some embodiments described herein. Although the blocks are illustrated in a sequential order, these blocks may in some instances be performed in parallel, and/or in a different order than those described therein. Also, the various blocks may be combined into fewer blocks, divided into additional blocks, and/or removed based upon desired implementation.

In addition, the flow diagrams of FIGS. 3 and 4 show the functionality and operation of one possible implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may also be, or include, any other volatile or non-volatile storage systems. The computer readable medium may be considered a computer readable storage medium, a tangible storage device, or other article of manufacture, for example.

Alternatively, each block in FIG. 3 or FIG. 4 may represent circuitry that is wired to perform the specific logical functions in the process. Illustrative methods, such as those shown in FIGS. 3 and 4, may be carried out in whole or in part by a component or components in the cloud and/or system. However, it should be understood that example methods may be carried out by other entities or combinations of entities (i.e., by other computing devices and/or combinations of computing devices), without departing from the scope of the invention.

For example, functions of the method of FIG. 3 or FIG. 4 may be fully performed by a computing device (or components of a computing device such as one or more processors), or may be distributed across multiple components of the computing device, across multiple computing devices, and/or across a server.

Referring first to FIG. 3, an example method 300 may include one or more operations, functions, or actions illustrated by blocks 302-308. In one embodiment, the method 300 is implemented in whole or in part by the insurer's computer system 16 of FIG. 1 (or one or more computing units thereof).

As shown by block 302, the method 300 includes receiving information indicative of protections against unauthorized electronic access to one or more electronic systems of a vehicle (e.g., one or more of subsystems 40, 42, 44, 46 and/or 48 of FIG. 1). In various example embodiments, the information indicative of protections against unauthorized electronic access may be one or more of a type of software of each of the electronic systems, a version of each of the electronic systems, and/or an update of each of the electronic systems.

In another example, receiving the information indicative of protections against unauthorized electronic access includes causing a wireless communication link to be established with the vehicle. In one scenario, the information indicative of the protections against unauthorized electronic access may be received via the wireless communication link. In another scenario, the vehicle identification information may also be received via the wireless communication link. In this scenario, the received vehicle identification information may be used to identify the corresponding insurance policy. In some embodiments, the wireless communication may provide for bi-directional communication between the vehicle and a computing system performing the method 300.

In another example, receiving the information indicative of protections against unauthorized electronic access includes causing a communication link to be established with a mobile device. For instance, a driver's or passenger's mobile device may be configured to establish a communication link with the vehicle using a Bluetooth link. In this instance, the mobile device may receive the information indicative of protections against unauthorized electronic access via the Bluetooth link. Further, the mobile device may also be configured to establish a wireless communication link with the computing system via a cellular telephone network in order to provide the information indicative of protections against unauthorized electronic access via the cellular telephone network.

As shown by block 304, the method 300 includes determining a vehicle security level based at least on the information indicative of protections against unauthorized electronic access. In one example, the vehicle security level may be determined relative to the best available software. For instance, it is possible that the best available software for the transmission electronics contains a security issue that has yet to be resolved by a manufacturer. In this instance, a "Good" vehicle security level may be determined despite the known security issue, based on the best available software being installed on the transmission electronics.

In another example, the vehicle security level may be determined in an absolute manner with regard to security threats. For instance, in the previous example where the best available software for the transmission electronics contains a security issue, a "Poor" vehicle security level may be determined based on the known security issue, despite there not being an update or fix to the best available software for the transmission electronics.

In another embodiment, block 304 may include determining a security metric of each of the electronic systems. The security metric may take into consideration a potential loss associated with the vehicle. For instance, the security metric may be a weight corresponding to how critical the electronic system is to the safe operation of the vehicle. By way of example, unauthorized access to the engine electronics (e.g., altering the engine speed) could greatly increase the likelihood of the vehicle being involved in an accident as compared to unauthorized access to the infotainment electronics (e.g., disabling the vehicle audio system). In this example, the information indicative of protections against unauthorized electronic access to the engine electronics may be weighted more heavily than the information indicative of protections against unauthorized electronic access to the infotainment electronics when determining the vehicle security level, in order to account for the higher risk of not having the most current version of software associated with the engine electronics.

As shown by block 306, the method 300 includes determining, based at least on the vehicle security level, a risk rating associated with the vehicle. For example, a "Low" risk rating may be determined based on a "High" vehicle security level, or a "High" risk rating may be determined based on a "Low" vehicle security level. In some embodiments, however, the risk rating is also based on additional parameters or factors associated with the driver and/or vehicle. For instance, the age and gender of the driver, history of traffic violations, and/or one or more other parameters or factors may be taken into consideration when determining the risk rating.

As shown by block 308, the method 300 includes setting at least one parameter of an insurance policy associated with the vehicle based on at least the determined risk rating. In one example, the parameter(s) may include a parameter corresponding to the cost of the insurance policy (e.g., a premium). In another example, the parameter(s) may include a parameter indicative of whether or not it is in the best interest of the insurance company to continue offering an insurance policy to the policy holder.

While not shown in FIG. 3, the method 300 may also include causing a policy holder to be notified about the modification. In one example, the notification may occur via a call, SMS, email, auto-generated letter for mail, website alert, notification via an application on a mobile device, etc. In one instance, the notification may prompt an individual to update the one or more electronic systems if updates are available.

Referring next to FIG. 4, the example method 400 may include one or more operations, functions, or actions as illustrated by blocks 402-408. In one embodiment, the method 400 is implemented in whole or in part by the insurer's computer system 16 of FIG. 1 (or one or more computing units thereof). As shown in FIG. 4, the method 400 corresponds to a more specific embodiment. In this embodiment, the method 400 is configured to detect whether one or more updates have been installed on one or more electronic systems (e.g., engine electronics 40 and/or transmission electronics 42 of FIG. 1, etc.). The method 400 may correspond to a more specific embodiment of the method 300 of FIG. 3, for example.

As shown by block 402, the method 400 includes receiving information indicative of updated protections against unauthorized electronic access installed on one or more electronic systems of a vehicle (e.g., one or more of subsystems 40, 42, 44, 46 and/or 48 of FIG. 1). In one example, the received information may include field values such as field values 208, 210, 214 and/or 216 of table 200 in FIG. 2.

As shown by block 404, the method 400 includes determining a vehicle security level based on the information indicative of the updated protections against unauthorized electronic access. In one example, the vehicle security level may be determined using vehicle security unit 80 of FIG. 1.

As shown by block 406, the method 400 includes determining, based on the vehicle security level, a risk rating associated with the vehicle. In one example, the risk rating may be determined using risk rating unit 82 of FIG. 1.

As shown by block 408, the method 400 includes modifying, at least one parameter of an insurance policy associated with the vehicle based on the determined risk rating. In one example, the at least one parameter may be modified using modification unit 84 of FIG. 1.

Figure 5:
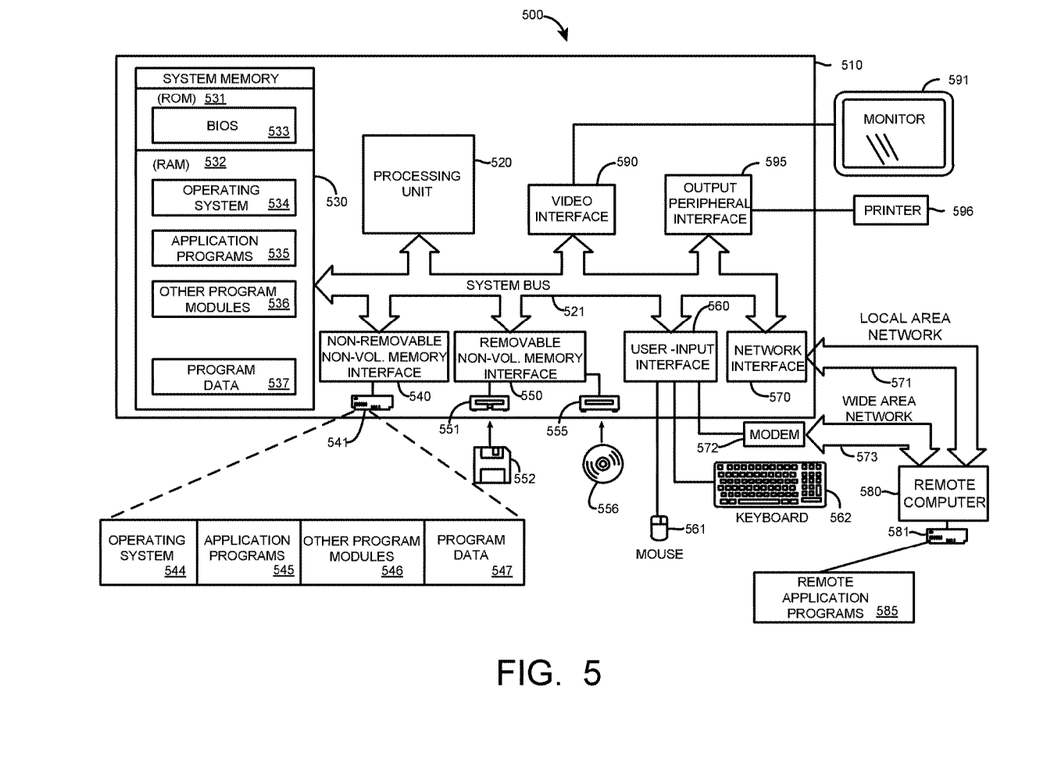
FIG. 5 is a block diagram of an example computer system on which a method may operate in accordance with one or more of the described embodiments.

FIG. 5 is a block diagram of an example computer system 500 on which a method may operate in accordance with any of the embodiments described above. The computer system 500 of FIG. 5 includes a computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer-readable media. Computer-readable media can be any available media that can be accessed by computer 510 and includes both volatile and nonvolatile media, and both removable and non-removable media. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 530 includes computer storage media in the form of volatile and/or nonvolatile memory such as ROM 531 and RAM 532. A basic input/output system (BIOS) 533, containing the basic routines that help to transfer information between elements within computer 510, such as during start-up, is typically stored in ROM 531. RAM 532 typically contains data and/or program modules that are immediately accessible to, and/or presently being operated on by, processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer-readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different reference numbers in FIG. 5 to illustrate that, at a minimum, they are different copies. A user may enter commands and information into the computer 510 through input devices such as a keyboard 562 and cursor control device 561, commonly referred to as a mouse, trackball or touch pad. A monitor 591 or other type of display device is also connected to the system bus 521 via an interface, such as a graphics controller 590. In addition to the monitor 591, computers may also include other peripheral output devices such as printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in hospitals, offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the input interface 560, or other appropriate mechanism. In a networked environment, program modules depicted relative to the computer 510, or portions thereof, may be stored in the remote memory storage device 581. By way of example, and not limitation, FIG. 5 illustrates remote application programs 585 as residing on memory device 581.

The communications connections 570, 572 allow the device to communicate with other devices. The communications connections 570, 572 are an example of communication media, as discussed above.

The methods of any of the embodiments described above (e.g., method 300 and/or method 400) may be implemented wholly or in part using one or more computer systems such as the computer system 500 illustrated in FIG. 5. Referring generally to the embodiments of FIG. 1, for example, the computer 510 may be used as the insurer's computer system 16, with the various units 80, 82, 84 and 86 being instructions that are a part of application programs 535 stored in RAM 532 and/or application programs 545 stored in hard disk drive 541. For example, data from onboard system 14 may be received via a modem similar to the modem 572, which may in turn be coupled to a network similar to network 20 of FIG. 1. As another example, a change in premium generated by the modification unit 84 of FIG. 1 may be sent to a remote billing system similar to the remote computer 580, where the data is stored on a memory device such as the memory storage device 581. As another example, the correlation database 100 may be provided to the insurer's computer system 16 of FIG. 1 as a removable memory source such as the nonvolatile magnetic disk 552 or the nonvolatile optical disk 556.

Some or all calculations performed in the embodiments described above (e.g., calculations for determining a vehicle security level, calculations for determining a risk rating, etc.) may be performed by a computer such as the computer 510, and more specifically may be performed by a processor such as the processing unit 520, for example. In some embodiments, some calculations may be performed by a first computer such as the computer 510 while other calculations may be performed by one or more other computers such as the remote computer 580. The calculations may be performed according to instructions that are part of a program such as the application programs 535, the application programs 545 and/or the remote application programs 585, for example.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of particular operations may be distributed among the one or more processors, not only residing within a single machine, but deployed across a number of machines. In some example embodiments, the processor or processors may be located in a single location (e.g., within a home environment, an office environment, a mobile platform, or as a server farm), while in other embodiments the processors may be distributed across a number of locations.

The performance of particular operations may be distributed among the one or more processors, not only residing within a single machine, but deployed across a number of machines. In some example embodiments, the one or more processors or processor-implemented modules may be located in a single geographic location (e.g., within a home environment, an office environment, a mobile platform, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "identifying," "predicting," "analyzing," and the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Of course, the applications and benefits of the systems, methods, and techniques described herein are not limited to only the above examples. Many other applications and benefits are possible by using the systems, methods, and techniques described herein. One skilled in the art will readily recognize from the discussion above that alternative embodiments of the structures and methods illustrated herein may be employed without departing from the principles described herein.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

I claim:

1. A computer-implemented method comprising:
    causing, by one or more processors of a computing system, a wireless communication link to be established with a vehicle, the wireless communication link communicatively coupling the vehicle and the computing system;
    receiving, automatically at regular time intervals, at the computing system, information indicative of protections against unauthorized electronic access to one or more electronic systems of the vehicle via the wireless communication link;
    receiving, automatically at the regular time intervals, at the computing system, vehicle identification information stored in the one or more electronic systems of the vehicle via the wireless communication link;
    identifying, by the one or more processors, an insurance policy associated with the vehicle based on the received vehicle identification information;
    determining, by the one or more processors, a vehicle security level based at least on the information indicative of protections against unauthorized electronic access;
    determining, by the one or more processors and based at least on the vehicle security level, a risk rating associated with the vehicle; and
    setting, by the one or more processors, at least one parameter of the insurance policy associated with the vehicle based on at least the determined risk rating.

2. The computer-implemented method of claim 1, further comprising:
    determining, by the one or more processors, whether the vehicle security level is increased in accordance with one or more security updates available for the one or more electronic systems;
    determining, by the one or more processors, a modification to the at least one parameter based at least on whether the vehicle security level is increased in accordance with the one or more security updates; and
    modifying, by the one or more processors, the at least one parameter in accordance with the determined modification.

3. The computer-implemented method of claim 2, further comprising:
    causing, by the one or more processors, a policy holder of the insurance policy to be notified about the modification.

4. The computer-implemented method of claim 1, wherein determining the vehicle security level comprises:
    determining, by the one or more processors, a security metric of each of the one or more electronic systems of the vehicle, wherein security metric is indicative of potential loss associated with the vehicle; and
    determining, by the one or more processors, the vehicle security level based at least on the information indicative of protections against unauthorized electronic access and the determined security metric.

5. The computer-implemented method of claim 1, wherein receiving the information indicative of protections against unauthorized electronic includes receiving, at the computing system, one or more of (i) a type of software of each of the one or more electronic systems of the vehicle, (ii) an update of each of the one or more electronic systems of the vehicle, and (iii) a version of software of each of the one or more electronic systems of the vehicle.

6. The computer-implemented method of claim 1, wherein causing a wireless communication link to be established with the vehicle includes causing a communication link to be established with a mobile device, wherein the mobile device is configured to communicate with the vehicle.

7. A system comprising:
    one or more computing devices; and
    a non-transitory computer-readable memory coupled to the one or more computing devices and storing thereon instructions that, when executed by the one or more computing devices, cause the one or more computing devices to:
    cause a wireless communication link to be established with a vehicle, the wireless communication link communicatively coupling the vehicle and the computing devices;
    receive, automatically at regular time intervals, information indicative of protections against unauthorized electronic access to one or more electronic systems of the vehicle via the wireless communication link;
    receive, automatically at the regular time intervals, vehicle identification information stored in the one or more electronic systems of the vehicle via the wireless communication link;
    identify an insurance policy associated with the vehicle based on the received vehicle identification information;
    determine a vehicle security level based at least on the information indicative of protections against unauthorized electronic access;
    determine, based at least on the vehicle security level, a risk rating associated with the vehicle; and
    set at least one parameter of the insurance policy associated with the vehicle based on at least the determined risk rating.

8. The system of claim 7, wherein the instructions stored on the non-transitory computer-readable memory are further executable to cause the one or more computing devices to:
    determine whether the vehicle security level is increased in accordance with one or more security updates available for the one or more electronic systems;
    determine a modification to the at least one parameter based at least on whether the vehicle security level is increased in accordance with the one or more security updates; and
    modify the at least one parameter in accordance with the determined modification.

9. The system of claim 7, wherein the instructions stored on the non-transitory computer-readable memory are further executable to cause the one or more computing devices to:
    cause a policy holder of the insurance policy to be notified about the modification.

10. The system of claim 7, wherein determining the vehicle security level comprises:
    determining a security metric of each of the one or more electronic systems of the vehicle, wherein security metric is indicative of potential loss associated with the vehicle; and determining the vehicle security level based at least on the information indicative of protections against unauthorized electronic access and the determined security metric.

11. The system of claim 7, wherein receiving the information indicative of protections against unauthorized electronic includes receiving, at the computing system, one or more of (i) a type of software of each of the one or more electronic systems of the vehicle, (ii) an update of each of the one or more electronic systems of the vehicle, and (iii) a version of software of each of the one or more electronic systems of the vehicle.

12. The system of claim 7, further comprising:
a database, wherein the database stores one or both of (i) one or more currently available security updates corresponding to at least one of the one or more electronic systems of the vehicle and (ii) one or more currently available versions of software corresponding to at least one of the one or more electronic systems of the vehicle.

13. The system of claim 12, wherein determining the vehicle security level based at least on the information indicative of protections against unauthorized electronic access comprises:
retrieving from the database one or both of (i) the one or more currently available security updates and (ii) the one or more currently available versions of software; and
determining the vehicle security level based at least on the information indicative of protections against unauthorized electronic access and one or both of (i) the one or more currently available security updates and (ii) the one or more currently available versions of software.

14. A computer-implemented method comprising:
causing, by one or more processors of a computing system, a wireless communication link to be established with a vehicle, the wireless communication link communicatively coupling the vehicle and the computing system;
receiving, automatically at regular time intervals, at the computing system, information indicative of updated protections against unauthorized electronic access installed on one or more electronic systems of the vehicle via the wireless communication link;
receiving, automatically at the regular time intervals, at the computing system, vehicle identification information stored in the one or more electronic systems of the vehicle via the wireless communication link;
identifying, by the one or more processors, an insurance policy associated with the vehicle based on the received vehicle identification information;
determining, by the one or more processors, a vehicle security level based on the information indicative of the updated protections against unauthorized electronic access;
determining, by the one or more processors and based on the vehicle security level, a risk rating associated with the vehicle; and
modifying, by the one or more processors, at least one parameter of the insurance policy associated with the vehicle based on the determined risk rating.

15. The computer-implemented method of claim 14, further comprising:
causing, by the one or more processors, a policy holder of the insurance policy to be notified about the modification.

16. The computer-implemented method of claim 14, wherein determining the vehicle security level comprises:
determining, by the one or more processors, a security metric of each of the one or more electronic systems of the vehicle, wherein security metric is indicative of potential loss associated with the vehicle; and
determining, by the one or more processors, the vehicle security level based at least on the information indicative of protections against unauthorized electronic access and the determined security metric.

17. The computer-implemented method of claim 14, wherein receiving the information indicative of protections against unauthorized electronic includes receiving, at the computing system, one or more of (i) a type of software of each of the one or more electronic systems of the vehicle, (ii) an update of each of the one or more electronic systems of the vehicle, and (iii) a version of software of each of the one or more electronic systems of the vehicle.

* * * * *